May 29, 1956  W. A. LEA  2,747,282
CAMERA VIEW FINDER
Original Filed Sept. 13, 1946
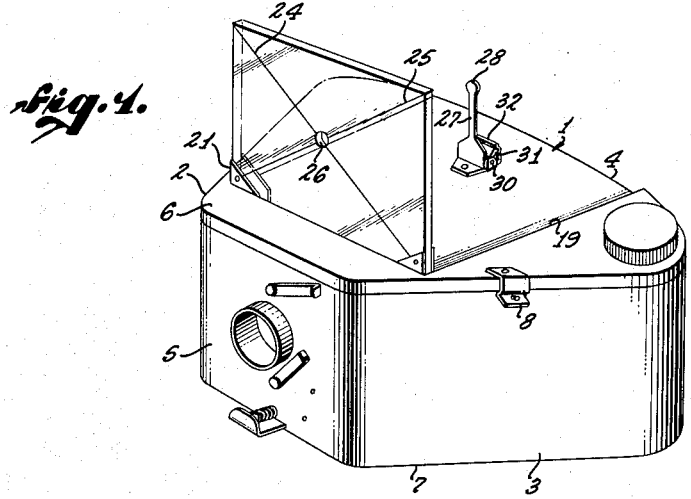
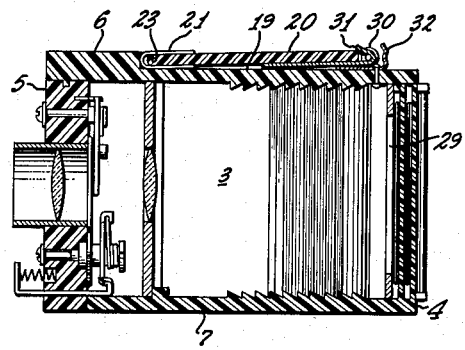
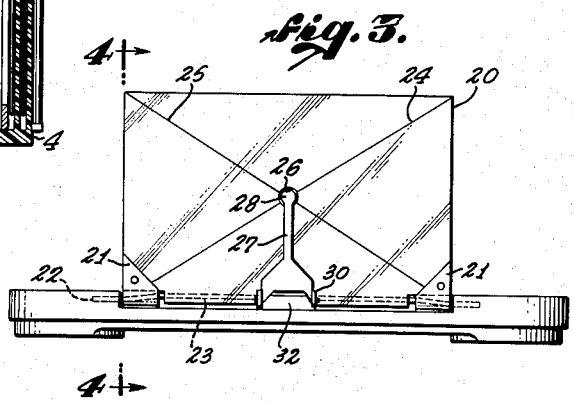
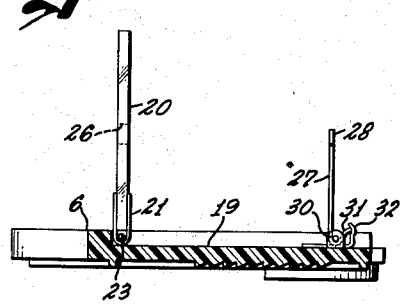
WALTER ALEXANDER LEA,
INVENTOR.
BY W E Beatty
ATTORNEY.

United States Patent Office 2,747,282
Patented May 29, 1956

2,747,282

CAMERA VIEW FINDER

Walter Alexander Lea, Los Angeles, Calif., assignor to Earl V. Ehrhardt, Altadena, Calif.

Original application September 13, 1946, Serial No. 696,706. Divided and this application February 25, 1950, Serial No. 146,271

2 Claims. (Cl. 33—64)

The invention relates to an improved view finder for a photographic camera.

The view finder of the usual small camera produces an optical reduction of the scene, with the result that the scene as viewed in the view finder is very small and usually difficult to see or find, also no means are provided for finding the center of the photographic field. This disadvantage is overcome according to the present invention which provides a view finder wherein the scene can be viewed in its natural size while making it possible to also view the adjoining or contiguous portions of the scene, means also being provided to indicate the center of the photographic field.

This patent application is a division of Serial Number 696,706 filed September 13, 1946, Patent 2,557,297 issued June 19, 1951, for Photographic Camera Body.

The camera body is further described and claimed in the above patent.

For further details of the invention reference may be made to the drawings wherein Fig. 1 is the perspective view of a camera embodying a view finder according to the present invention.

Fig. 2 is a vertical sectional view along the optical axis of the camera of Fig. 1.

Fig. 3 is a rear view in elevation of the view finder.

Fig. 4 is a sectional view of lines 4—4 of Fig. 3 looking in the direction of the arrows.

Referring in detail to the drawings, the camera of Fig. 1 is in the form of a box or casing 1 having tapered sides 2 and 3, a curved back 4 and a flat front 5, with parallel top 6 and bottom 7. The top 6 is removable and held in place by suitable clips 8.

The casing 1 may be made of plastic or other opaque material. Figs. 1 and 2 illustrate substantially the full size and shape preferred, although other sizes and shapes may be employed.

The top 6 has a rectangular recess 19 at the front edge of which is connected a view finder 20 by a hinge 21. As shown in Figs. 3 and 4, the hinge 21 has a wire 22 which is secured at its opposite ends in the top 6, the wire passing through the hinge 21. Also the wire passes through the hinge 21 at a greater height as indicated at 23 than it is secured to the top 6, this offset serving as a tension device to hold the view finder upright. This offset does not exist when the view finder 20 is folded into the recess 19 as shown in Fig. 2.

The view finder 20 is a rectangular plate of transparent pink plastic, the color pink being preferred as it forms a contrast with the average scene. The view finder 20 has crossing lines 24, 25 which define the center of hole 26. Hole 26 is completely transparent while finder plate 20, being of pink color, is not completely transparent. Behind the finder 20 is a rear sight 27, its upper end being rounded as indicated in 28 to mask the hole 26 when the eye of the operator is close to the camera and in position to look directly forward in line with the optical axis of the camera. A line through the elements 28, 26 is parallel to the optical axis and while this results in a small amount of vertical parallax, this can be ignored for amateur work and is quite small as the camera is small. The plate 20 in effect forms a window, as the operator looks directly through it to the scene, and when the eye is close to the rear of the camera, the size of the field of view on the plate 20 is the same as the field of view which passes through the exposure aperture in the camera to expose the film. Also when the top 28 of the rear sight and the aperture 26 appear in alignment, the rear sight element 28 masks very slightly and thereby defines the center of the photographic field. When the rear sight portion 28 is not masking hole 26, there is a contrast between that part of window 26 which is not masked and the plate 20, to show how the camera should be moved to effect complete masking and center the field of view on plate 20.

The plate 20 is free from opaque material around its side and top margins whereby the operator can by glancing to one side or the other see the adjoining or contiguous portion of the scene and hence readily decide whether to point the camera in a different direction to position properly the item of principal interest in the picture.

The rear sight 27 is mounted on a hinge 30, see Fig. 4, and it has a spring arm 31 adapted to engage a spring catch 32 to hold the rear sight 27 upright. When the view finder is to be collapsed, the rear sight 27 is moved counter-clockwise as seen in Fig. 4 so that it will lie flat on the bottom of recess 19 as shown in Fig. 2. The plate 20 is then swung down on top of the rear sight 27 and the spring arm 31 forms a spring catch to engage the top edge of view finder 20.

Various modifications may be made in the invention without departing from the spirit of the following claims.

I claim:

1. A camera having a top having a direct vision view finder comprising a plate of transparent material having a color contrasting with daylight, and a hinge at one edge of said plate for supporting said plate upright on top of the camera in position to intercept a direct line of sight from the eye of the operator to the scene to be photographed, the side and top margins of said plate being unrestricted by opaque material and the contiguous actual scene being visible beyond said margins of the plate, a small central window in said plate, said central window being of greater transparency than said plate, and a cooperating obturator rear sight for said window.

2. A camera casing having a top, a recess in said top, a transparent plate fitting in said recess, a hinge at the front of said recess for said plate, said plate having a central sight window, a rear obturator sight having a hinge support in said recess, said rear sight having an extension adapted to overlie the rear edge of said plate when said plate is in said recess overlying said rear sight, and a catch for said extension to hold said rear sight upright when said plate is upright.

References Cited in the file of this patent

UNITED STATES PATENTS

| 613,430 | Springsteen | Nov. 1, 1898 |
|---|---|---|
| 1,123,740 | Hesse | Jan. 5, 1915 |
| 1,267,323 | Kleidman | May 21, 1918 |
| 1,411,675 | Tessier | Apr. 4, 1922 |

FOREIGN PATENTS

| 14,473 | Great Britain | Aug. 13, 1900 |
|---|---|---|
| 581,356 | France | Sept. 26, 1924 |
| 721,209 | France | Dec. 12, 1931 |
| 831,831 | France | June 13, 1938 |
| 668,999 | Germany | Dec. 14, 1938 |
| 542,537 | Great Britain | Jan. 14, 1942 |